(12) United States Patent
Fagiano et al.

(10) Patent No.: US 9,366,232 B2
(45) Date of Patent: Jun. 14, 2016

(54) SYSTEM FOR CONVERTING WIND ENERGY INTO ELECTRICAL ENERGY THROUGH THE FLIGHT OF POWER WING PROFILES TETHERED TO THE GROUND BY CABLES OF A FIXED LENGTH, WITHOUT PASSIVE PHASES, AND WITH AUTOMATIC ADAPTATION TO WIND CONDITIONS

(75) Inventors: Lorenzo Fagiano, Zurich (CH); Mario Milanese, Turin (IT)

(73) Assignee: KITENERGY S.R.L, Turin (IT)

( * ) Notice: Subject to any disclaimer, the term of this patent is extended or adjusted under 35 U.S.C. 154(b) by 354 days.

(21) Appl. No.: 14/006,900

(22) PCT Filed: Mar. 20, 2012

(86) PCT No.: PCT/IB2012/051378
§ 371 (c)(1),
(2), (4) Date: Dec. 3, 2013

(87) PCT Pub. No.: WO2012/127444
PCT Pub. Date: Sep. 27, 2012

(65) Prior Publication Data
US 2014/0077495 A1    Mar. 20, 2014

(30) Foreign Application Priority Data
Mar. 23, 2011   (IT) .............................. TO2011A0251

(51) Int. Cl.
*F03D 9/00*        (2016.01)
*H02P 9/04*        (2006.01)
(Continued)

(52) U.S. Cl.
CPC    *F03D 9/002* (2013.01); *F03D 5/02* (2013.01); *F03D 11/04* (2013.01);
(Continued)

(58) Field of Classification Search
CPC ................ F03D 5/00; F03D 5/04; F03D 5/05
USPC .......... 290/44, 55; 244/155 R, 155 A, 153 A, 244/153 R, 30, 32, 33, 59
See application file for complete search history.

(56) References Cited

U.S. PATENT DOCUMENTS

| 3,987,987 A | 10/1976 | Payne et al. |
| 4,076,190 A | 2/1978 | Lois |

(Continued)

FOREIGN PATENT DOCUMENTS

| EP | 1 672 214 B1 | 2/2008 |
| FR | 2 897 903 A1 | 8/2007 |

(Continued)

OTHER PUBLICATIONS

Ben Ruhe, "Using Kites to Generate Electricity: Plodding, Low Tech Approach Wins", Kite the Drachen Foundation Journal, No. 16, Fall 2004, Dec. 21, 2004, p. 2, 14-16.

(Continued)

*Primary Examiner* — Tulsidas C Patel
*Assistant Examiner* — Thomas Quigley
(74) *Attorney, Agent, or Firm* — Heslin Rothenberg Farley & Mesiti, P.C.; Victor A. Cardona, Esq.

(57) ABSTRACT

Wind energy is converted into electrical or mechanical energy through the flight of at least one power wing profile tethered via one or more cables to a ground unit moved by the power wing profile along a path of alternating displacement for driving a generator, where the path of alternating displacement is orientable so as to set itself in a direction substantially orthogonal to the direction of the wind. During the phases of flight of the power wing profile in conditions of generation of energy the length of the cables is kept constant.

29 Claims, 6 Drawing Sheets

(51) Int. Cl.
  *F03D 5/02* (2006.01)
  *F03D 11/04* (2006.01)
(52) U.S. Cl.
  CPC ...... *F05B 2240/311* (2013.01); *F05B 2240/93* (2013.01); *F05B 2240/94* (2013.01); *F05B 2240/941* (2013.01); *F05B 2240/95* (2013.01); *Y02E 10/70* (2013.01); *Y02E 10/721* (2013.01); *Y02E 10/727* (2013.01)

(56) References Cited

U.S. PATENT DOCUMENTS

| | | | |
|---|---|---|---|
| 4,251,040 A | | 2/1981 | Loyd |
| 4,470,563 A | * | 9/1984 | Engelsman ............. F03D 11/04 244/115 |
| 6,254,034 B1 | | 7/2001 | Carpenter |
| 6,327,994 B1 | * | 12/2001 | Labrador ............... B01D 61/10 114/382 |
| 6,523,781 B2 | | 2/2003 | Ragner |
| 6,914,345 B2 | | 7/2005 | Webster |
| 7,656,053 B2 | | 2/2010 | Griffith et al. |
| 2007/0120004 A1 | | 5/2007 | Olson |
| 2010/0213718 A1 | * | 8/2010 | Kelly ....................... F03D 5/04 290/55 |
| 2012/0049533 A1 | * | 3/2012 | Kelly ....................... F03D 5/04 290/55 |

FOREIGN PATENT DOCUMENTS

| | | |
|---|---|---|
| IT | TO2010A00258 | 3/2010 |
| JP | 2008075486 A | 4/2008 |
| WO | 2007/121904 A1 | 11/2007 |
| WO | 2008/047963 A1 | 4/2008 |
| WO | 2009/035492 A1 | 3/2009 |

OTHER PUBLICATIONS

Massimo Canale et al., "High Altitude Wind Energy Generation Using Controlled Power Kites", IEEE Transactions on Control Systems Technology, pp. 1-15, IEEE 2009 Xplore.
M. Milanese et al. "Control as a Key Technology for a Radical Innovation in Wind Energy Generation", 2010 American Control Conference Marriott Waterfront, Baltimore, MD, USA, Jun. 30-Jul. 2, 2010, p. 2361-2377.
Dario Piga, "Analisi delle prestazioni del sistema kitegen: eolico di alta quota" ("Analysis of performance of the Kitegen system: high-altitude-wind power"), Turin Polytechnic, 2008.
Lorenzo Fagiano, "Control of Tethered Airfoils for High-Altitude Wind Energy Generation", Turin Polytechnic, 2009.
Joe Hadzicki "Buggy" appearing in the magazine Drachen Foundation Journal, No. 16, Autumn 2004.
International Search Report (PCT/ISA/210) and Written Opinion (PCT/ISA/237) of Corresponding PCT International Application No. PCT/IB2012/051378 filed on Mar. 22, 2012, completed on Jun. 21, 2013 and mailed on Jun. 28, 2012.

* cited by examiner

SYSTEM FOR CONVERTING WIND ENERGY INTO ELECTRICAL ENERGY THROUGH THE FLIGHT OF POWER WING PROFILES TETHERED TO THE GROUND BY CABLES OF A FIXED LENGTH, WITHOUT PASSIVE PHASES, AND WITH AUTOMATIC ADAPTATION TO WIND CONDITIONS

CROSS REFERENCE TO RELATED APPLICATIONS

This application is a 371 National Phase of PCT International Application No. PCT/IB2012/051378 filed on Mar. 22, 2012, and published in English as WO 2012/127444 A1 on Sep. 17, 2012, which claims priority to Italian Patent Application No. TO2011A000251 filed on Mar. 23, 2011, the entire disclosures of which are incorporated herein by reference.

FIELD OF THE INVENTION

The present invention relates to a system for converting wind energy into electrical energy that exploits the alternating motion, along a given path, of a unit set on the ground and drawn by a power wing profile. Said wing profile is tethered to the ground unit by at least one cable and is controlled automatically by a purposely provided control system. The cable or cables that connects/connect the ground unit to the wing profile has/have a fixed length during normal operation of the system. The conversion system is able to adapt automatically, by changing appropriately the path of the ground unit, to the variations of direction of the wind so as to optimize the production of energy. The path of the ground unit is proposed in two possible shapes, namely, a segment of a straight line or else the arc of a circumference, but can in general be of various shapes.

The present invention moreover regards a strategy of optimal regulation, on the basis of the intensity of the wind as a function of the altitude from ground level, of the length of the cables for said system for converting wind energy into electrical or mechanical energy.

The present invention moreover regards a system for applying the aforesaid conversion system and previous innovations in the marine context, in particular for exploiting off-shore wind.

The present invention likewise regards a strategy of automatic control of the flight of a power wing profile for said system for converting wind energy into electrical energy that is able to take into account the conditions of the wind in order to maximize the production of energy, at the same time preventing operating conditions that are potentially harmful or dangerous for the integrity of the system.

Finally, the present invention regards a system for recovery and management of the energy during the phases of reversal of the motion of said system for converting wind energy into electrical energy, namely, when the ground generating unit reaches the end of the pre-set path and starts to move along the same path in an opposite direction.

PRIOR ART

Known to the art, from some papers appearing in magazines both of a scientific nature and at a popular level and from some prior patents, are processes for converting wind energy by means of devices that are able to convert the mechanical energy generated by the wind source into some other form of energy, typically electrical energy, which subtract energy from the wind using power wing profiles (generally referred to as "kites") connected thereto by means of cables. For example, the U.S. Pat. No. 3,987,987, U.S. Pat. No. 4,076,190, U.S. Pat. No. 4,251,040, U.S. Pat. No. 6,254,034 B1, U.S. Pat. No. 6,914,345 B2, U.S. Pat. No. 6,523,781 B2, U.S. Pat. No. 7,656,053 and the international patent No. WO/2009/035492 describe systems for converting the kinetic energy of wind currents into electrical energy via control of the flight of power wing profiles connected to the ground via one or more cables. In many of such systems, at least one wing profile is connected by cables to a manoeuvring and energy-generating unit, fixed on the ground, and is cyclically guided through a traction phase, in which it ascends pushed by the wind and during which unwinding of the cables sets in rotation a generator of the ground unit, designed for generating electrical energy, and a recovery phase, in which the profile is recovered via re-winding of the cables and then manoeuvred so as to start another traction phase. Said solutions present the advantage of having a ground structure that has a contained cost and is relatively simple to build. However, there is the considerable disadvantage of a continuous motion of winding and unwinding of the cables, at a rate that may be high and with considerable forces of traction. It follows that there can arise considerable problems of wear of the cables with consequent high costs for frequent replacements thereof and inactivity of the generator during said replacement operations.

Moreover known are solutions such as, for example, the one described in the European patent No. EP 1 672 214 B1, where the ground unit is constituted by a circular carousel, set in rotation by a series of power wing profiles, and the energy is generated by the rotary motion of the carousel. Said solution can be also obtained via a series of ground units that move in a co-ordinated way along a circular rail, as described, for example, in the paper by M. Canale, L. Fagiano and M. Milanese, "High Altitude Wind Energy Generation Using Controlled Power Kites", appearing in IEEE Transactions on Control Systems Technology No. 18, pp. 279-293, 2010. Said carousel solution can operate both with variable length of the cables and with fixed length of the cables. The carousel solution with variable cable length enables energy to be obtained also from the motion of unwinding of the cables, in addition to the one obtained from the rotary motion of the carousel, but presents the disadvantages of wear of the cables, mentioned previously for the configurations fixed on the ground, and of higher cost and considerable constructional complexity. The carousel solution with fixed cable length presents the advantage of limiting wear of the cables; however, it is able to generate only a limited amount of energy on account of the so-called "passive phase", which is necessary for drawing the wing profiles in a direction opposite to the wind for an angle of rotation of approximately 70°.

The considerations summarized above are supported by the theoretical studies and by the numeric analyses present in the paper by M. Milanese, L. Fagiano and D. Piga, "Control as a key technology for a radical innovation in wind energy generation", presented at the American Control Conference 2010, Baltimore, Md., and published in the corresponding proceedings, where there emerge clearly the disadvantages and advantages of all the solutions referred to above of generating systems based upon the flight of power wing profiles, with the generating unit set on the ground.

SUMMARY OF THE INVENTION

The object of the present invention is to solve all the problems referred to above present in the current configurations by providing a system for converting wind energy into electrical energy through the flight of power wing profiles tethered to the ground, in which the energy is generated by the alternating motion of the ground unit along a given path. Said system generates energy by operating with cables of a fixed length, thus preventing problems of wear of the cables. In addition, apart from the transients of takeoff and landing of the wing profiles, for reasons of maintenance or owing to absence of the wind, it does not present passive phases, thanks to an appropriate choice of the path of the ground unit, thus enabling a higher energy production as compared to current solutions, given the same characteristics of the power wing profile. Known in the prior art is a system named "Buggy" appearing in the magazine Drachen Foundation Journal, No. 16, Autumn 2004, and attributed to Joe Hadzicki. The "Buggy" system enables operation with constant cable length and does not present passive phases; however, it is limited in so far as it operates in optimal conditions only for well-determined values of direction of the wind, whilst, as said conditions vary, the energy produced is lower. The present invention enables these limits to be overcome in so far as it is able to adapt to the variations of direction of the wind. Finally, the present invention envisages the possibility of application to the off-shore context, the big advantage of which as compared to current off-shore technologies, in addition to enabling capture of the high-altitude-wind power, is that of not requiring foundations or anchorages to the seabed. All this enables, as compared to current solutions based upon traditional wind towers, considerable reduction in the costs of off-shore generation of wind energy and considerable increase in the number of installation sites.

The above and further purposes and advantages of the invention, as will emerge from the sequel of the description, are achieved with a method for converting wind energy into electrical energy, which is based upon the flight of wing profiles tethered with cables of prevalently fixed length and adapts to the direction of the wind, as defined in Claim 1 and in the claims subordinate thereto, as well as with a system as defined in Claim 15 and in the claims subordinate thereto.

BRIEF DESCRIPTION OF THE DRAWINGS

The present invention will be described in greater detail through some preferred embodiments thereof, which are provided by way of non-limiting example, with reference to the attached drawings, wherein.

DETAILED DESCRIPTION OF THE INVENTION

Figure 1:
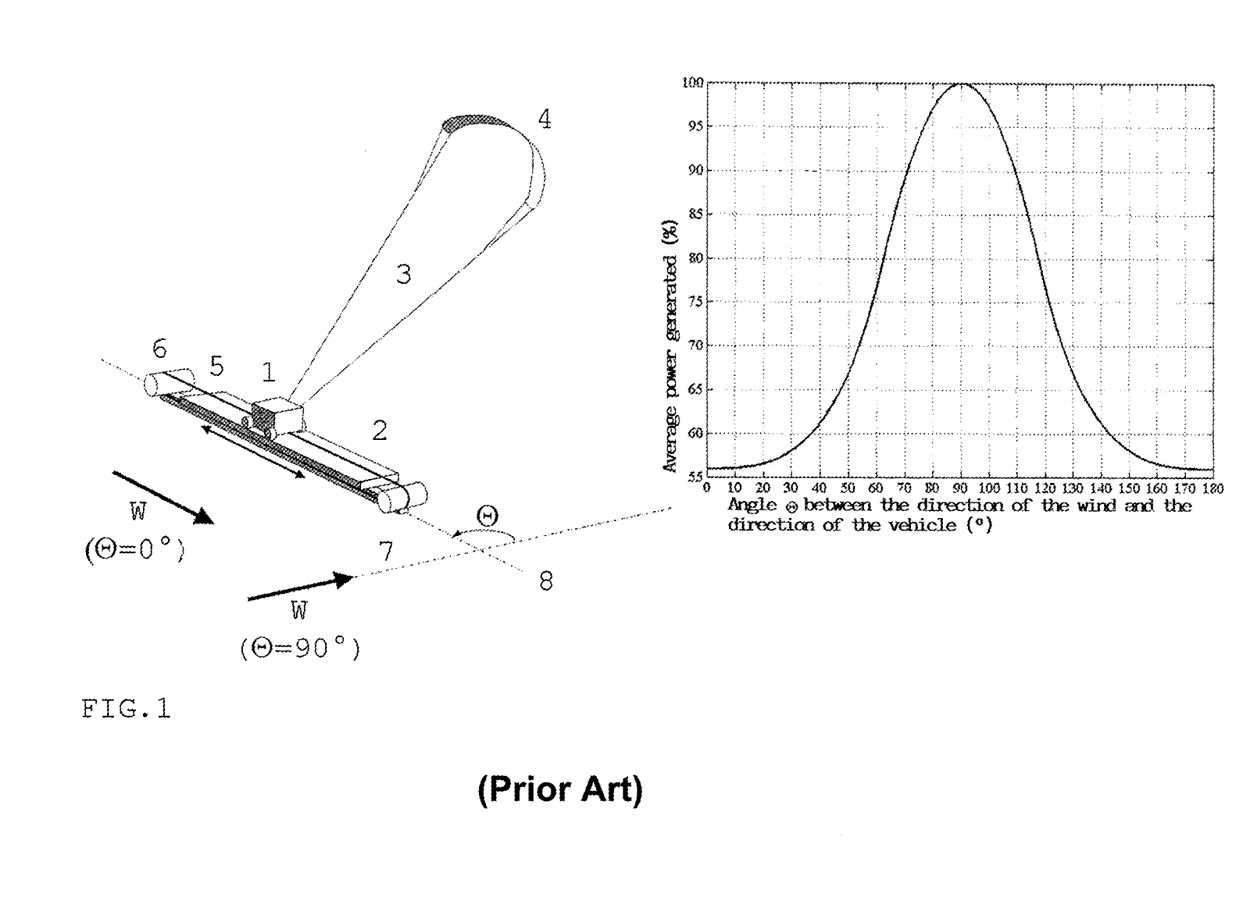
FIG. 1 is a schematic representation of the "Buggy" system as presented in the magazine Drachen Foundation Journal, No. 16, and the corresponding mean power generated as the direction of the wind varies.

With initial reference to FIG. 1, it may be noted that in the system of the "Buggy" type the ground unit 1 moves in an alternating way along a path 2 shaped like a segment of a straight line, pulled, via the cables 3, by a power wing profile 4. The ground unit 1 is able to manoeuvre the power wing profile 4 via solutions forming part of the prior art, for example according to the patent application No. TO2010A000258, or possibly according to other future inventive ideas and constructional solutions. The energy is generated via a mechanical-transmission system 5 of a chain or belt type that converts the motion of translation of the ground unit into a motion of rotation of appropriate electric generators 6. As emerges from the analyses present in various publications, such as the graduation thesis by D. Piga, "Analisi delle prestazioni del sistema kitegen: eolico di alta quota" ("Analysis of performance of the Kitegen system: high-altitude-wind power"), Turin Polytechnic, 2008, and the doctoral thesis by L. Fagiano, "Control of Tethered Airfoils for High-Altitude Wind Energy Generation", Turin Polytechnic, 2009, the mean power generated by the Buggy system, for fixed characteristics of the wing profile and of intensity of the wind, varies with the angle $\Theta$ between the direction 7 of the wind W, shown by way of example in FIG. 1 in two possible conditions, with $\Theta=0°$ and with $\Theta=90°$, and the direction 8 of the path of the ground unit. The plot of said variation, in percentage value with respect to the maximum value achievable for assigned characteristics of the wing profile and of the wind conditions, is represented in the graph of FIG. 1. Note that the maximum production of energy is obtained when the direction of the wind is perpendicular to the direction of the ground unit. The system introduced with the present invention is able to modify the path of the ground unit so as to maintain always an optimal inclination with respect to the direction of the wind.

Figure 2:
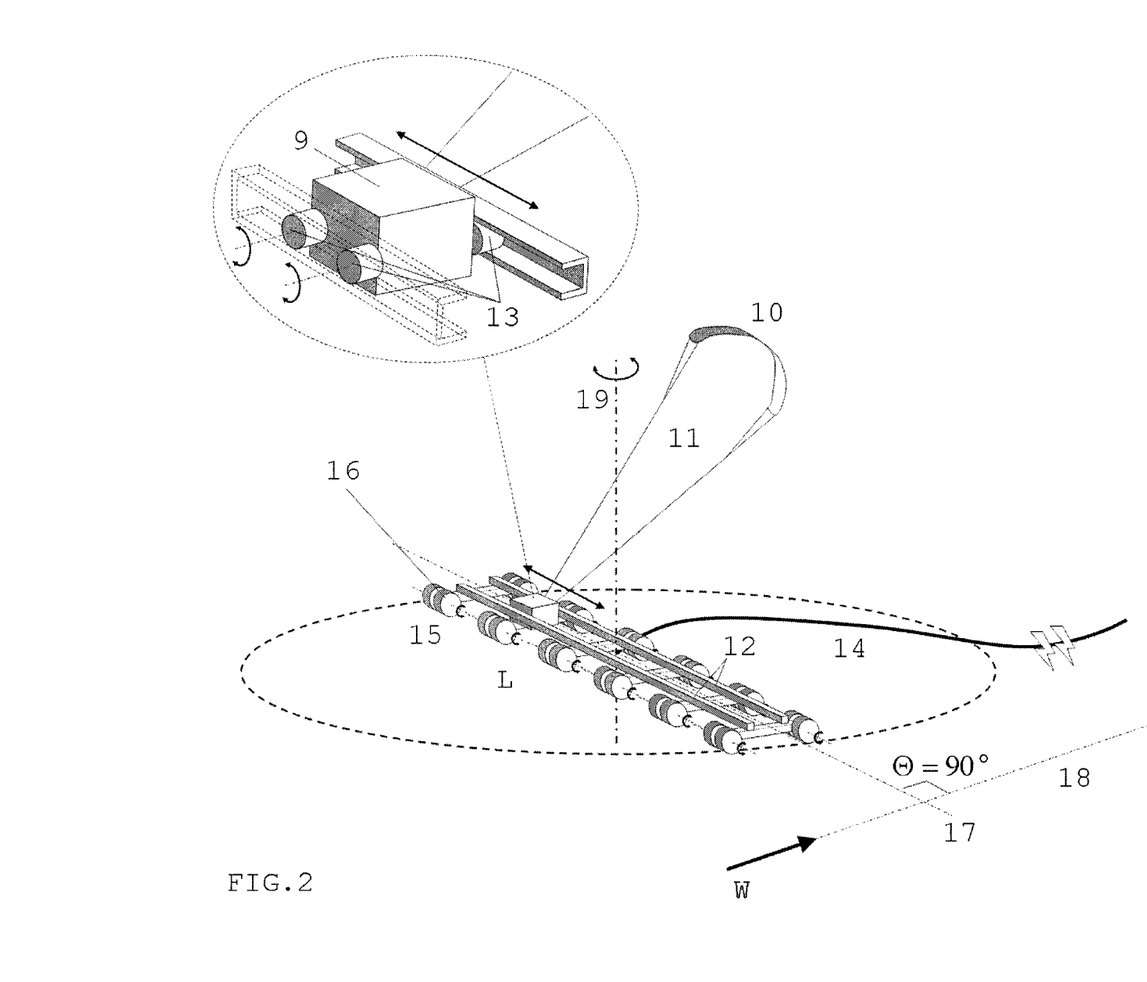
FIG. 2 is a schematic representation of a first embodiment of the system proposed by the present invention.

With reference now to FIG. 2, it may be noted that a first embodiment of the system proposed by the present invention is constituted by a ground unit 9, able to control and manoeuvre a power wing profile 10 connected thereto via one or more cables 11. The ground unit is constrained to move along a system of rectilinear rails 12 and follows continuously in alternating directions the length of said rails, drawn along by the forces of traction exerted by the wing profile 10 on the cables 11. The energy is generated with the prior technique illustrated in FIG. 1 or with one or more systems 13 applied to the ground unit 9, each constituted by a wheel connected, via a transmission system, to an electric generator. In addition, the energy can also be generated by building in an appropriate way the ground unit and the system of rails so as to form a linear generator/motor. The electricity generated is appropriately managed and transmitted via cables 14 to a fixed structure, designed for its introduction into the grid and possibly for its accumulation with purposely provided devices known to the art, such as inertial or hydrogen systems. The construction of the ground unit 9, of the system of rails 12, and of the systems 13 is such as to guarantee rolling of the wheels of the systems 13 in all wind conditions and conditions of motion of the ground unit 9 so as to prevent any sliding and consequent losses of efficiency by friction. In addition, the system of rails 12 is able to balance the forces exerted by the cables 11 on the ground unit 9, except for the force in the direction of motion, which is balanced by the opposite force applied by the generating systems 13 and which represents the useful force for generation of electrical energy. The systems 13 are appropriately controlled automatically and co-ordinated with the system for control of the wing profile 10 performed by the ground unit 9 in order to regulate the speed of the ground unit in an optimal way to maximize the mean power generated during motion. The systems 13 are moreover able to act also as motors in the phases of reversal of the motion of the ground unit in order to contain the time required for said phases as much as possible. In particular, there is implemented a strategy of energy recovery during braking of the ground unit 9 and of subsequent use of the energy recovered for accelerating the unit 9 in the subsequent path in the opposite direction. Said strategy is described more fully hereinafter with reference to FIG. 6. The energy-recovery strategy can be obtained also in the case, described previously, where the ground unit and the system of rails constitute a linear generator/motor. The system of rails 12 is moreover equipped with two or more suspension and movement systems 15, which are constituted by an appropriate mechanical structure capable of supporting and constraining the system of rails 12, opposing the forces exerted by the ground unit 9 during its motion and moreover limiting the consequent vibrations, and are provided with wheels 16 connected to appropriate motors controlled automatically and co-ordinated in order to orient the system of rails 12 in such a way that the direction 17 of the motion of the ground unit 9 is always perpendicular to the direction 18 of the wind W, i.e., the angle $\Theta$ is equal to 90°, as shown in FIG. 2, thus obtaining always the maximum mean production of energy, according to the qualitative diagram appearing in FIG. 1. The direction 18 of the wind W is measured in real time at various altitudes in a range from level 0 (ground) to an altitude sufficient to include all the conditions of motion of the wing profile, for example 1000 m from the ground; said measurement is made, for example, with systems of a lidar or sodar type that enable measurement of the direction and intensity of the wind, information that is necessary also for control of the wing profile 10 according to what has already been disclosed in the scientific literature, for example, by the article of M. Canale, L. Fagiano, and M. Milanese, "High Altitude Wind Energy Generation Using Controlled Power Kites", appearing in IEEE Transactions on Control Systems Technology, No. 18, pp. 279-293, 2010. Rotation of the system of rails 12 is about the vertical axis 19, identified by the intersection of the plane of symmetry of the system 12 perpendicular to the direction of the rails with the plane of symmetry of the system 12 parallel to the direction of the rails, thus defining an area of territory potentially occupied by the generating system, which has an as a whole circular shape with a diameter equal to L, where L is the length of the system of rails 12. Said length is sized on the basis of the characteristics of wind and morphology of the terrain in the site preselected for installation of the generating system so as to maximize the power generated per unit surface potentially occupied, also possibly taking into account the presence of other similar adjacent generating systems constituting a so-called "wind farm". The power generated by the system proposed by the invention as has just been described with reference to FIG. 2 is independent of the direction 18 of the wind W, thanks to the automatic adaptation of the orientation of the system of rails 12 as said direction varies, whereas it varies as the characteristics of intensity of the wind in relation to the length of the cables 11 vary. In particular, for a given configuration of the system in terms of diameter of the cables and inertial, geometrical, and aerodynamic characteristics of the wing profile and for a given characteristic of increase of the speed of the wind with the altitude from the ground, the maximum power generated varies as a function of the length of the cables according to a concave plot, with a maximum corresponding to an optimal length of the cables. Said phenomenon is due to balancing between the effect of higher forces on the cables due to stronger winds intercepted with longer cables, with consequent higher power generation, and the opposite effect of greater aerodynamic resistance of the cables as their length increases, with consequent loss of efficiency and hence lower power generation. For the purposes of automatic adaptation not only to the direction of the wind but also to its characteristics of intensity and of variation of intensity as the altitude from the ground varies, the system proposed by the present invention is provided with an automatic system of regulation of the length of the cables, obtained according to solutions present in the prior art such as the one described in the patent application No. TO2010A000258, which operates according to two possible strategies. In a first strategy, the real-time measurements of the speed of the wind at the various altitudes, obtained, as has already been said, via a system, for example, of a lidar or sodar type, are appropriately conditioned and used for calculating a model of increase of the wind as the altitude from the ground varies. Said model is then used for calculating the corresponding power curve as the length of the cables varies, according to simplified equations such as, for example, those published in the doctorate thesis by L. Fagiano, "Control of Tethered Airfoils for High-Altitude Wind Energy Generation", Turin Polytechnic, 2009, and the optimal length of the cables is set and regulated so as to obtain the maximum of said curve. According to a second strategy, the length of the cables is regulated in an adaptive way at regular time intervals, for example of an hour, exploiting the concavity of the power characteristic as a function of the length of the cables, i.e., varying the length of the cables until the mean electric power measured reaches the maximum value.

Figure 3:
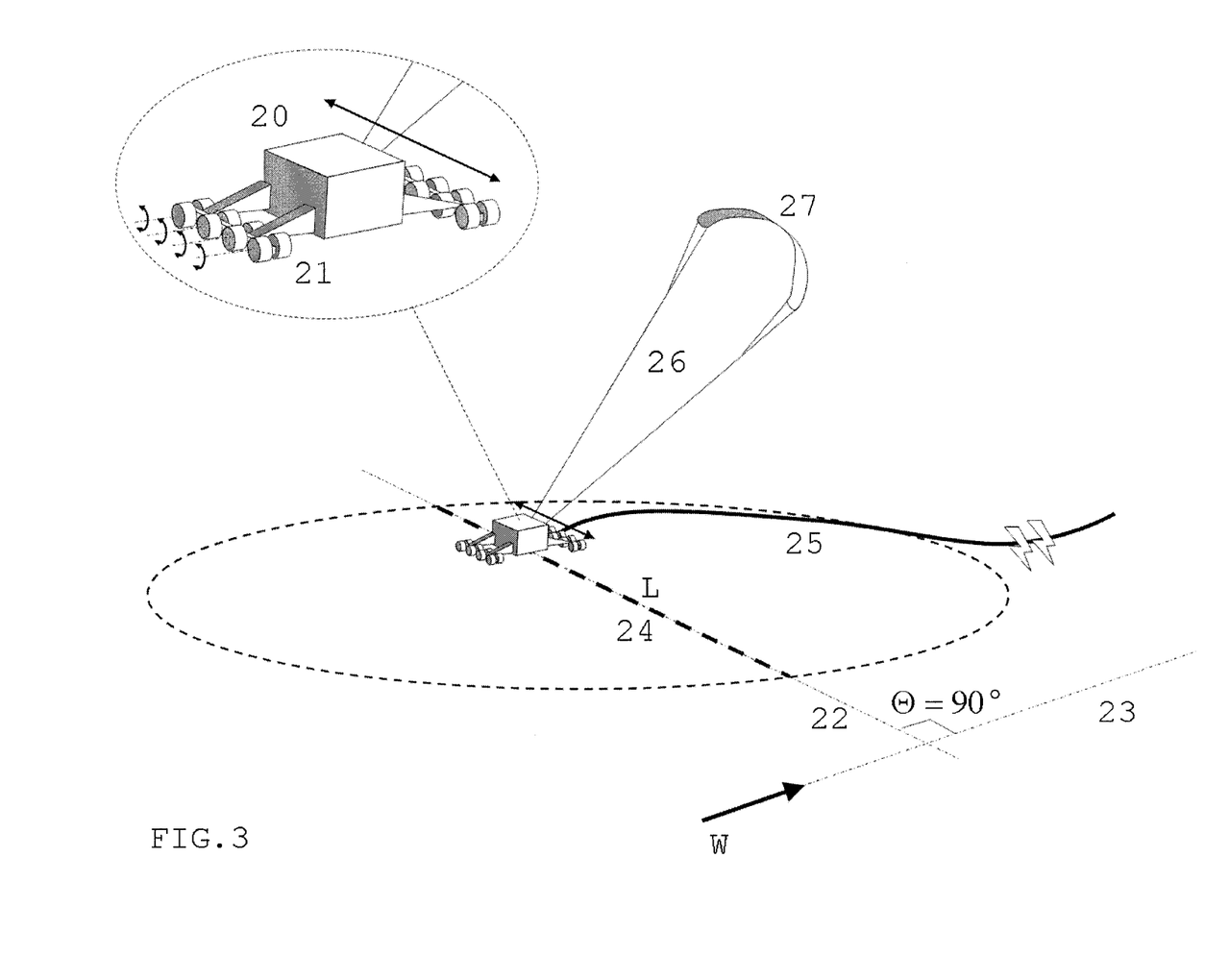
FIG. 3 is a schematic representation of a second embodiment of the system proposed by the present invention.

FIG. 3 shows a second possible embodiment of the generating system proposed by the present invention. The operating principle is similar to that of the solution described previously with reference to FIG. 2; however, in this second embodiment, the ground unit 20 is provided with a system 21 constituted by a mechanical frame and by a series of wheels connected to electric generators. The system 21 is able to balance the lateral and vertical forces exerted by the cables on the ground unit and to direct, via a system of automatic steering of the wheels, motion of the ground unit so as to maintain a direction 22 perpendicular to the direction 23 of the wind W, thus maximizing the power generated. The length L of the path 24 followed by the ground unit defines the maximum occupation of area on the ground by the system, which also in this case is equal to a circumference of diameter L with its centre corresponding to the central point of the path 24. The system is provided with a strategy of optimal regulation of the length of the cables like the one described previously. In a way similar to the previous solution, the energy generated is transferred via cables 25 to a fixed structure designed for its introduction into the grid or for its accumulation. The advantage of this second solution is a greater simplicity of construction of the structure, at the expense of a greater complexity of the ground unit that must be able to counter the lateral forces exerted by the cables 26 that connect the power wing profile 27 with the ground unit 20.

Figure 4:
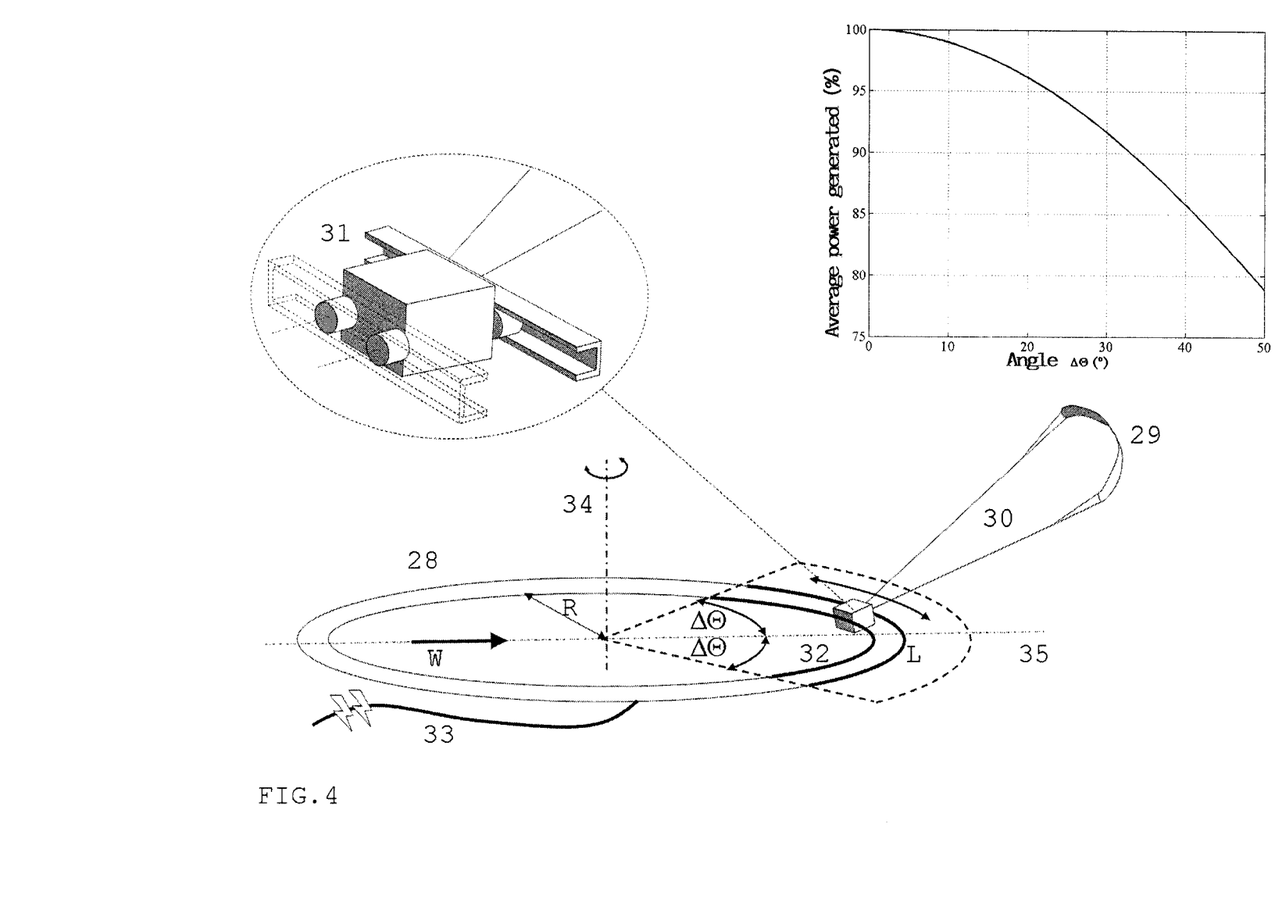
FIG. 4 is a schematic representation of a third embodiment of the system proposed by the present invention.

With reference now to FIG. 4, a third possible embodiment of the system proposed by the invention consists in providing a system 28 of fixed rails, with a circular path of radius R, along which there can move, drawn by the wing profile 29 via the cables 30, the ground unit 31, made in a way similar to the ground unit 9 of the first solution shown in FIG. 2, with the due modifications that render possible motion along a circular path. In way similar to the first solution described previously with reference to FIG. 2, the system of rails 28 is able to constrain the ground unit and balance the forces acting in all directions except the direction tangential to the rails themselves. Generation of energy is obtained by getting the ground unit to describe a path 32 shaped like the arc of a circumference in alternating directions and in a continuous way. Also in this solution, like in the solution of FIG. 2, the energy can possibly be generated by building in an appropriate way the ground unit and the system of rails so as to form a linear generator/motor. The electricity produced is appropriately managed and transmitted, for example, via cables 33, to a fixed structure, designed for its introduction into the grid and possibly for accumulation with purposely provided devices known to the art, as already described previously. The path 32 has an angular amplitude equal to $2\Delta\Theta$ and is modified automatically, via a rotation about the vertical axis 34, so as to be always symmetrical with respect to the direction 35 of the wind W, as shown in FIG. 4. As the angle $\Delta\Theta$ increases, the mean power generated varies as shown in the diagram of FIG. 4. The radius R and the amplitude $2\Delta\Theta$ of the path are hence chosen so as to achieve the best compromise between the occupation of the territory, defined by the circumference of radius 2R, the linear length of the path of the ground unit, equal to $2\Delta\Theta R$, and the mean power generated. Also this third solution is able to adapt automatically the length of the cables to the conditions of intensity of the wind, as described previously. The advantage of this third solution is that of presenting a greater simplicity of construction of the structure as compared to the first solution shown in FIG. 2, given that the system of rails 28 is fixed to the ground, and a greater simplicity of construction of the ground unit as compared to the second solution shown in FIG. 3, thanks to the presence of the rails 28 that balance the lateral forces exerted by the cables on the ground unit 31. These advantages are obtained at the expense of a lower mean power generated and of a certain higher variability of the power generated during the path of a curved shape.

Figure 5:
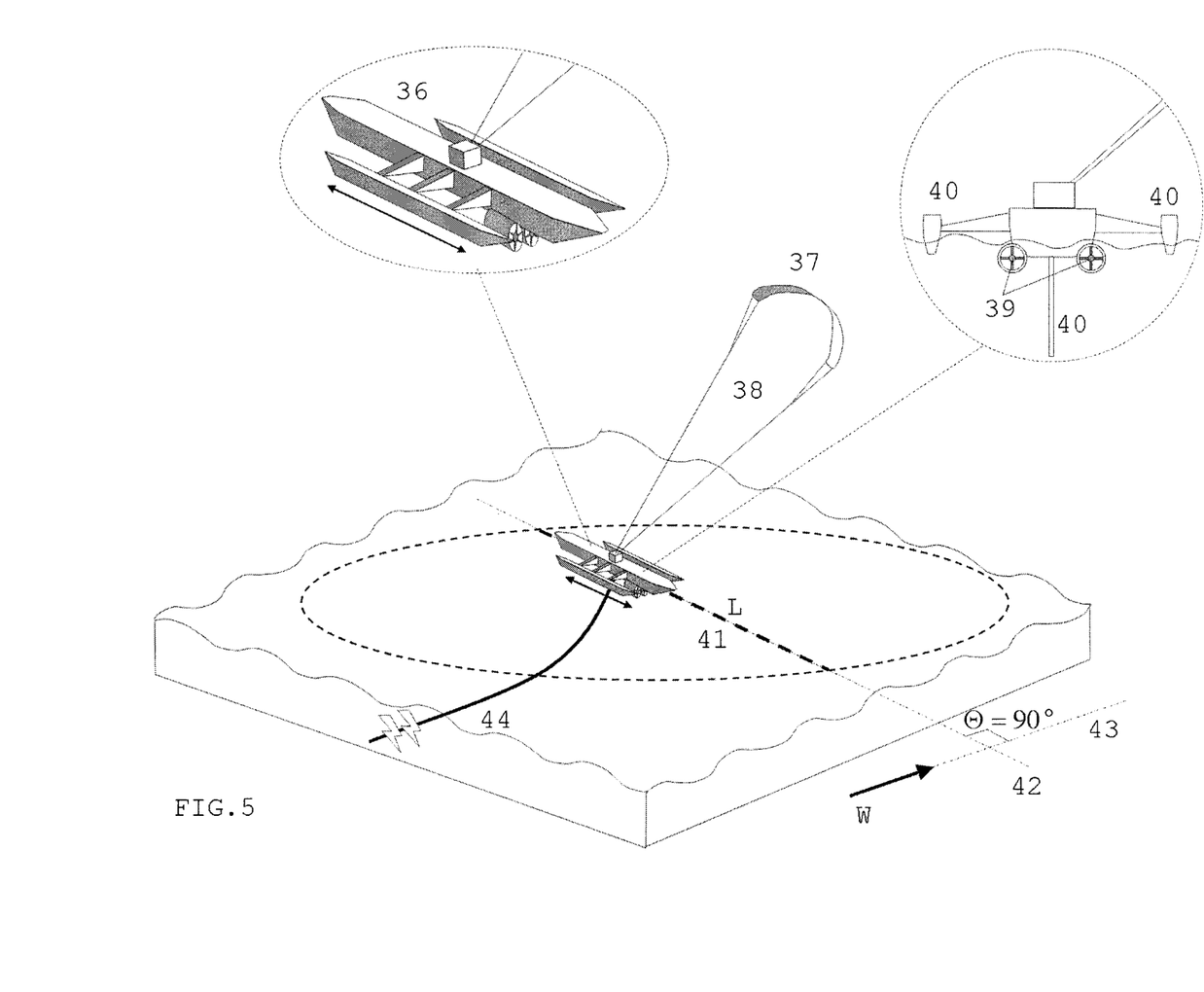
FIG. 5 is a schematic representation of an off-shore embodiment for the system proposed by the present invention.

With reference to FIG. 5, an application in the off-shore context of the system proposed by the present invention is constituted by a watercraft 36, drawn by the wing profile 37 via the cables 38, with functions similar to the ground unit 20 of the second solution shown in FIG. 3. The energy is generated via appropriate turbines 39 set underneath the hull of the watercraft 36, which oppose the motion of the watercraft itself. A purposely provided automatic control of the turbines 39 and the presence of stabilizing elements 40, possibly hydrodynamic and active according to solutions known to the prior art, limit the roll and leeway and guarantee the directionality of the watercraft in its alternating motion along the path 41, the direction 42 of which is regulated automatically so as to be always perpendicular to the direction 43 of the wind W, thus maximizing power generation. The electrical energy is appropriately managed and transmitted via underwater cables 44 to a fixed structure, designed for its introduction into the grid and possibly for its accumulation with purposely provided devices known to the art, such as inertial or hydrogen systems. The length L of the path 41 is chosen so as to maximize the mean power per unit surface of sea occupied. The occupation of space is given by a circumference of radius L centred in the central point of the path 41. Also this application in the off-shore context is provided with a system for automatic regulation of the length of the cables as described previously.

Figure 6:
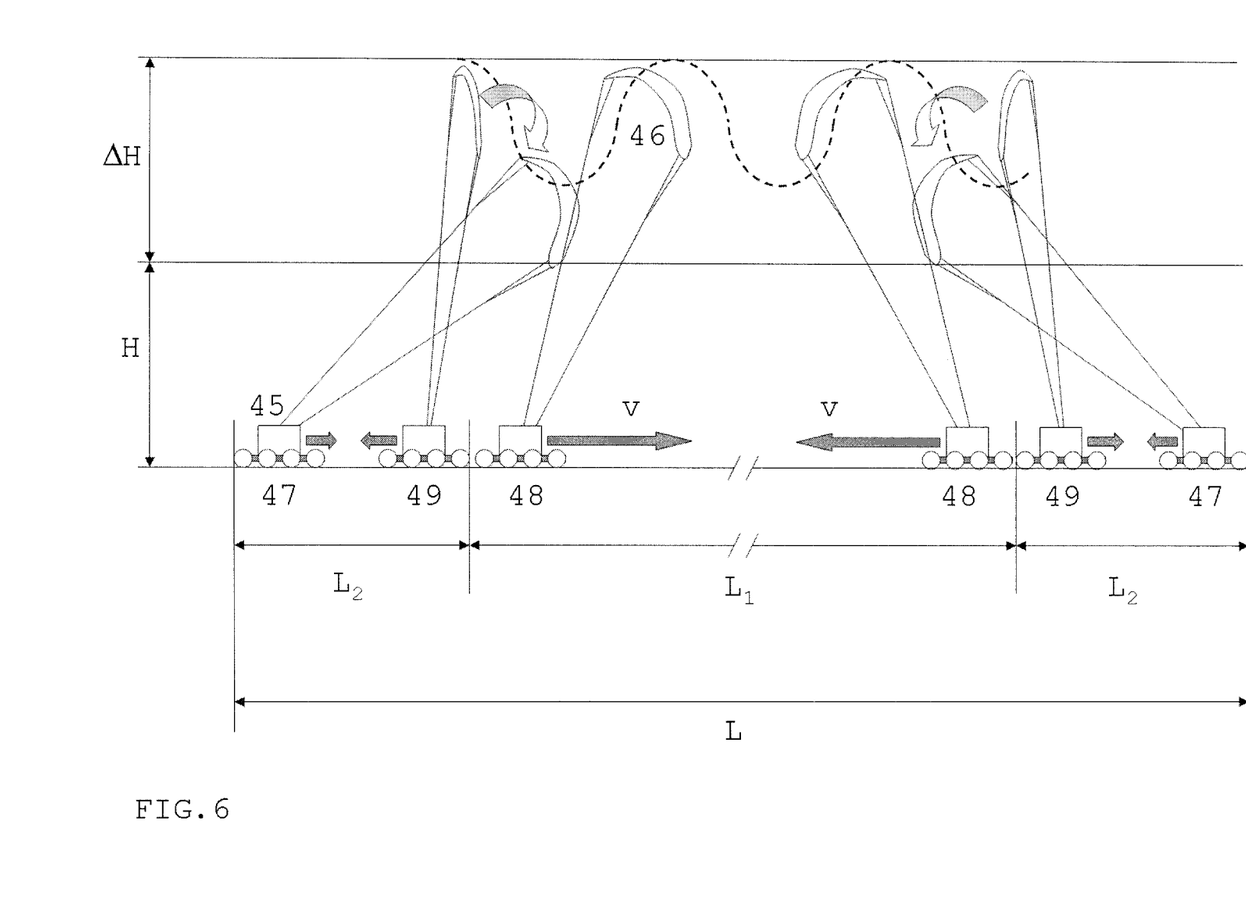
FIG. 6 is a schematic representation of a control strategy for the system proposed by the present invention, with recovery and reuse of the energy in the phases of reversal of motion.

FIG. 6 is a schematic representation of a control strategy suitable for all the solutions proposed by the present invention. In particular, appearing in FIG. 6 are the projections, in the plane perpendicular to the direction of the wind, of the ground unit 45 and of the wing profile 46 in different positions along the path, designated as positions 47, 48 and 49. Said positions are reproduced twice, in a specular way, in so far as they occur during the motion of the ground unit 45 in both directions along its path. The control strategy is constituted by three steps identified by appropriate segments $L_1$ and $L_2$ in FIG. 6, which added together come to form the projection of the path of the ground unit 45 in the plane perpendicular to the direction of the wind. Without this implying any loss of generality, the length of said projection is designated by L in FIG. 6: in the case of the first and second solutions proposed by the present invention, shown in FIG. 2 and in FIG. 3, respectively, said length coincides with the length of the path of the ground unit 45, whilst, in the case of the third solution shown in FIG. 4, the effective length of the path of the ground unit 45 will be greater than L and, to be precise, equal to $L\Delta\Theta/\sin(\Delta\Theta)$. As emerges from FIG. 6, the length L can be broken down as $L=L_1+2L_2$, and the length $L_1$ is typically much greater than the length $L_2$. The first step of the control strategy is referred to as "acceleration step" and is comprised between the moment when the ground unit 45 starts from stationary at one of the two ends of the path L (position designated by 47 in FIG. 6) and accelerates in the direction of the other end, and the moment when the ground unit 45 has reached a certain value v of speed, referred to as "steady-state speed" (position designated by 48 in FIG. 6). At start of the acceleration step, the wing profile 46 is manoeuvred so as to be very inclined in the direction of the acceleration so as to supply a considerable traction force in the presence of a low speed of the ground unit 45. During the acceleration step, said inclination of the wing profile 46 decreases gradually whilst the ground unit 45 increases its own speed in order to maintain a high effective speed of the wind on the power wing profile 46. The motors/generators set on the ground unit 45 are controlled automatically in such a way that the speed v will be reached after covering a length $L_2$ of the path, as shown in FIG. 6, also re-using the energy recovered in the "braking step" described hereinafter. After the acceleration step, the "steady-state step" starts, during which the ground unit 45 is drawn by the power wing profile 46 at a constant speed v, regulated via a purposely provided automatic control of the generators applied on the ground unit 45. During the steady-state step, the wing profile is controlled so as to describe fast displacements upwards and downwards to maximize the effective speed and, consequently, the power generated. After covering the length $L_1$, the braking step finally starts, with the ground unit 45 set in the position designated by 49 in FIG. 6, where the generators applied on the ground unit are used together with a braking system for stopping the motion of the ground unit in the space $L_2$, recovering as much energy as possible. Simultaneously, the wing profile 46 is controlled so as to set itself in a position useful for the subsequent acceleration step, i.e., with considerable inclination along the path in a direction opposite to the movement of the ground unit during the braking step. The control system is moreover designed for containing the motion of the wing profile between a minimum height H and a maximum height H+H from the ground, and for controlling the motion of the wing profile in order to prevent the traction forces acting on the cables from exceeding a critical value for integrity of the system. The values of L, $L_1$, $L_2$, H and H are set so as to maximize the mean power generated, at the same time limiting occupation of air space. All the functions described can be obtained, for example, via control algorithms of a non-linear predictive type, appropriately choosing constraints and cost function, in a way altogether similar to what is described in regard to conversion systems different from those proposed by the present invention, in the paper by M. Canale, L. Fagiano, and M. Milanese, "High Altitude Wind Energy Generation Using Controlled Power Kites", appearing in IEEE Transactions on Control Systems Technology, No. 18, pp. 279-293, 2010.

The invention claimed is:

1. A method for converting wind energy into electrical or mechanical energy through the flight of at least one power wing profile tethered via at least one cable to a ground unit moved by said power wing profile along a path of alternating displacement for driving generator means, wherein said path of alternating displacement is curved and orientable so as to set itself in a direction substantially orthogonal to the direction of the wind.

2. The method according to claim 1, wherein during phases of the flight of the power wing profile in conditions of generation of energy a length of said at least one cable is kept constant.

3. The method according to claim 2, wherein a value of the constant length of said at least one cable is determined on the basis of a measurement of an intensity of the wind and of its gradient in relation to a height of the power wing profile with respect to the ground.

4. The method according to claim 1, wherein said curved path of displacement is an arc of a circumference angularly variable about a vertical axis passing through a center of rotation of said axis.

5. The method according to claim 1, wherein said path of alternating displacement is situated on the ground, wherein an orientation of said path with respect to the ground is obtained by a rolling contact.

6. The method according to claim 1, wherein said ground unit is guided along said path of alternating displacement with a non-sliding contact.

7. The method according to claim 6, wherein said contact is provided via rolling members applied to said ground unit and operatively connected to said generator means.

8. The method according to claim 7, further comprising controlled steering of said rolling members.

9. The method according to claim 7, wherein said rolling members are subjected to braking for reversal of motion of the ground unit relative to said path of alternating displacement, and the braking energy is recovered for accelerating said ground unit following upon reversal of motion.

10. The method according to claim 1, wherein said path of alternating displacement is situated on a liquid surface of floating.

11. The method according to claim 1, wherein said path of alternating displacement comprises, together with the ground unit, a linear motor/generator.

12. A system for converting wind energy into electrical or mechanical energy through a flight of at least one power wing profile tethered via at least one cable to a ground unit moved by said power wing profile along a path of alternating displacement for driving generator means, the system comprising means for orienting said path of alternating displacement in a curved direction substantially orthogonal to the direction of the wind.

13. The system according to claim 12, further comprising means for measuring an intensity of the wind and a gradient of the wind in relation to a height of the power wing profile with respect to the ground, and means for controlling a length of said at least one cable based on the intensity and the gradient.

14. The system according to claim 12, further comprising means for measuring the power delivered by said generator means and means for controlling a length of said at least one cable based on the power measured.

15. The system according to claim 12, wherein said path of alternating displacement is defined by guide rails and said ground unit is provided with rolling members engaged to said guide rails.

16. The system according to claim 15, wherein said rolling members of the ground unit are operatively connected to said generator means.

17. The system according to claim 15, wherein said guide rails are orientable about a vertical axis passing through a center of a system of the rails.

18. The system according to claim 17, wherein said guide rails are provided with members for rolling on the ground.

19. The system according to claim 12, wherein said ground unit is provided with members for rolling on the ground that are steerable to define said path of alternating displacement.

20. The system according to claim 19, wherein said rolling members of the ground unit are operatively connected to said generator means.

21. The system according to claim 15, wherein said guide rails are circular and said path of alternating displacement is constituted by an angularly variable sector of said circular guide rails.

22. The system according to claim 19, wherein operatively associated to said rolling members are braking means for reversal of motion of the ground unit with respect to said path of alternating displacement, and means for recovery of the braking energy for accelerating said ground unit following upon reversal of motion.

23. The system according to claim 12, wherein said path of alternating displacement is defined by guide rails and said rails and said ground unit comprise a linear generator/motor capable of generating energy.

24. The system according to claim 23, wherein said linear generator/motor is able to convert the motion of said ground unit into electric power and to brake said ground unit and effect recovery of the braking energy for accelerating said ground unit following upon reversal of motion.

25. The system according to claim 12, wherein said unit consists of a body floating on a liquid surface.

26. The system according to claim 25, wherein said generator means of the floating body include submerged turbines that are drivable to determine the direction of said alternating displacement.

27. A method for converting wind energy into electrical or mechanical energy through the flight of at least one power wing profile tethered via at least one cable to a ground unit moved by said power wing profile along a path of alternating displacement for driving generator means, wherein said path of alternating displacement is orientable so as to set itself in a direction substantially orthogonal to the direction of the wind; and wherein said path of alternating displacement comprises, together with the ground unit, a linear motor/generator.

28. A system for converting wind energy into electrical or mechanical energy through a flight of at least one power wing profile tethered via at least one cable to a ground unit moved by said power wing profile along a path of alternating displacement for driving generator means, the system comprising means for orienting said path of alternating displacement in a direction substantially orthogonal to the direction of the wind;

wherein said path of alternating displacement is defined by guide rails and said ground unit is provided with rolling members engaged to said guide rails; and wherein said guide rails are circular and said path of alternating displacement is constituted by an angularly variable sector of said circular guide rails.

29. A system for converting wind energy into electrical or mechanical energy through a flight of at least one power wing profile tethered via at least one cable to a ground unit moved by said power wing profile along a path of alternating displacement for driving generator means, the system comprising means for orienting said path of alternating displacement in a direction substantially orthogonal to the direction of the wind; and wherein said path of alternating displacement is defined by guide rails and said rails and said ground unit comprise a linear generator/motor capable of generating energy.

\* \* \* \* \*

UNITED STATES PATENT AND TRADEMARK OFFICE
CERTIFICATE OF CORRECTION

| | | |
|---|---|---|
| PATENT NO. | : 9,366,232 B2 | Page 1 of 1 |
| APPLICATION NO. | : 14/006900 | |
| DATED | : June 14, 2016 | |
| INVENTOR(S) | : Fagiano et al. | |

It is certified that error appears in the above-identified patent and that said Letters Patent is hereby corrected as shown below:

On the title page PCT Filed item (22): Delete "March 20, 2012" and insert --March 22, 2012--

Signed and Sealed this
Twenty-third Day of August, 2016

Michelle K. Lee
*Director of the United States Patent and Trademark Office*